United States Patent [19]

Wocher et al.

[11] 4,165,511

[45] Aug. 21, 1979

[54] REDUCTION OF ECHOES OF IRRELEVANT TARGETS IN A VEHICLE ANTI-COLLISION RADAR SYSTEM

[75] Inventors: Berthold Wocher, Leonberg; Heinz Pfitzmaier; Thomas Pfendler, both of Gerlingen, all of Fed. Rep. of Germany

[73] Assignee: Robert Bosch GmbH, Stuttgart, Fed. Rep. of Germany

[21] Appl. No.: 841,707

[22] Filed: Oct. 13, 1977

[30] Foreign Application Priority Data

Oct. 15, 1976 [DE] Fed. Rep. of Germany ....... 2646540

[51] Int. Cl.$^2$ ............................................... G01S 9/02
[52] U.S. Cl. .................................................. 343/7 VM
[58] Field of Search .......................... 343/7 VM, 5 R

[56] References Cited

U.S. PATENT DOCUMENTS

| | | | |
|---|---|---|---|
| 3,921,749 | 11/1975 | Kawala | 343/7 VM |
| 4,011,563 | 3/1977 | Robbi | 343/7 VM |
| 4,072,945 | 2/1978 | Katsumata et al. | 343/7 VM |

FOREIGN PATENT DOCUMENTS 2623643 8/1977 Fed. Rep. of Germany ...... 343/7 VM

*Primary Examiner*—Maynard R. Wilbur
*Assistant Examiner*—Lawrence Goodwin
*Attorney, Agent, or Firm*—Frishauf, Holtz, Goodman & Woodward

[57] ABSTRACT

A signal proportional to steering angle is produced by a potentiometer controlled by the steering wheel, except for steering angles below about 0.1° that are frequently used for corrections in driving on a straight course. For steering angles above about 0.5°, the signal remains constant in magnitude. The signal controls a range gate of the radar system suppressing the effect of echoes beyond a maximum range limit smaller than the intercept of a radar ray at the beam edge on an arc concentric with the curved path of the vehicle having a radius of curvature exceeding that of the vehicle path by a predetermined amount which is chosen so as to preclude reception of echoes from guard rails situated on the outside of highway curves. The steering angle signal can be provided together with other functions contributing to a maximum range limit operation for the radar for a more comprehensive elimination of echoes irrelevant to the anti-collision purpose of the radar, thereby reducing unnecessary warnings.

5 Claims, 4 Drawing Figures

REDUCTION OF ECHOES OF IRRELEVANT TARGETS IN A VEHICLE ANTI-COLLISION RADAR SYSTEM

This invention concerns a radar system for a motor vehicle in which the range of distances within which a detected target must be in order to produce an indication or alarm is limited, in order to prevent false alarms from echoes from sign posts or from vehicles coming in the opposite direction, particularly as the vehicle carrying the radar proceeds around a curve in the highway.

Radar equipment for automobiles has already been proposed in which the effective range is automatically limited by one or more parameters of the driving conditions. In particular, it has been proposed to limit the operating range of the vehicle safety radar in terms of the vehicle speed, the maximum braking deceleration and/or the reaction time of the driver. It has also been proposed to provide devices in the roadway that will provide advance warning of a curve in such a manner as automatically to cause the radar system in the vehicle to alter its operation in some way that will reduce the likelihood of a false alarm by detection of irrelevant targets while driving around the curve that follows. The first of these proposed systems would indeed limit the maximum target range as the vehicle goes around a curve, for example, as the result of a reduction in speed that commonly accompanies driving around a curve in the highway, but such measures do not in fact reduce the maximum range by the required amount. In the second proposal above described, there are practical difficulties because of the necessity of providing special warning devices along the road, for example inductive transmitters or the like, upon which the radar system of the vehicle is dependent, so that the radar system is therefore not reliable where these special facilities have not been provided.

It is an object of the present invention to provide means in a motor vehicle safety radar system for reducing the sensitivity to irrelevant targets when the vehicle is driven around a curve in the road.

SUMMARY OF THE INVENTION

Briefly, the maximum range of a forward looking pulse radar system in a motor vehicle is limited as a function of the steering angle, so that with an increase of steering angle away from the straight ahead position of the steering gear, the maximum range for which the radar is sensitive to echoes is reduced. The maximum range OT is so reduced that for a steering angle $\alpha$ exceeding a predetermined lower limit value, which value may be different for the two directions of turning, the maximum range is caused to be always smaller than the distance $a_{OT}$ between the vehicle K and a point A at which a beam edge radar ray, defined as a particular ray at an angle to the center of the beam, intersects an arc of which the radius of curvature exceeds by a predetermined amount $\Delta R$ the radius of curvature R of a curve path around which the vehicle is being steered. $\Delta R$ is preferably set so that it is just less than the closest probable position of a guard rail on the outside of a curve in the highway. The predetermined lower limit of the steering angle $\alpha$ is so chosen that normal steering corrections such as take place in driving on a straight path do not lead to any influence on the maximum range sensitivity of the radar.

The function of the distance $a_{OT}$ is approximated by a function composed of rectilinear segments. The equipment for control of the radar range operates in response to an electrical signal corresponding to the steering angle $\alpha$. Such an electrical signal is preferably produced by a potentiometer having an arm displaceable by the steering gear of the vehicle.

The method and apparatus of the invention has the advantages that the particular conditions accompanying the driving around a curve are taken account of and that the safety radar system of the vehicle is independent of additional special devices located outside the vehicle and is capable of operating on all kinds of roadways. The use of an electrical steering angle taken from the tap of a potentiometer controlled by the steering mechanism of the vehicle has the advantage that the maximum radar range can be limited not only by the steering angle signal, but by other operating parameters, in accordance with previous proposals, that can likewise be represented by electrical signals, all of which are provided to a combined maximum range control system, for example, to control a range gate in the manner disclosed in our copending patent application Ser. No. 729,663, filed Oct. 5, 1976, now U.S. Pat. No. 4,132,991 owned by the assignee of the present invention.

The invention is described further by way of illustrative example with reference to the annexed drawings, in which.

Figure 1:
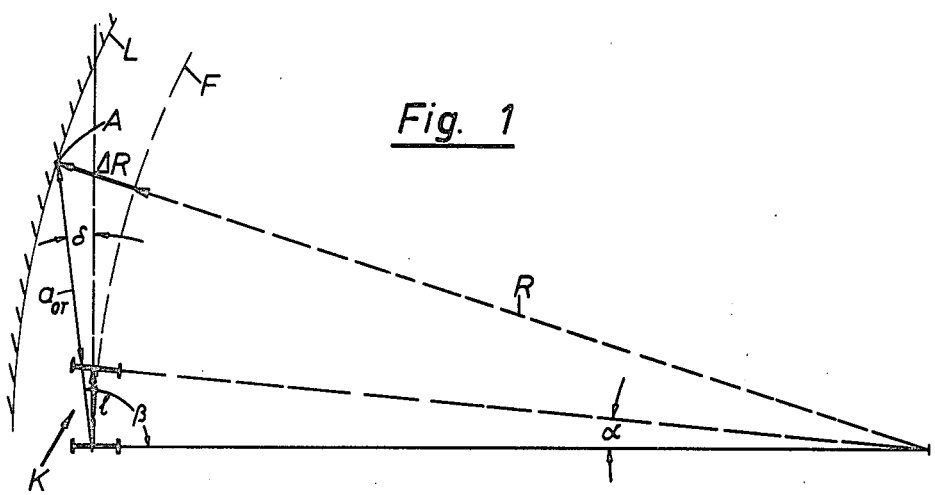
FIG. 1 is a diagram of the interrelation of the more important parameters that are to be determined by the radar system with which a vehicle is equipped in accordance with the present invention when it drives through a curve in the road.

In FIG. 1, there is shown a curved highway providing a vehicle path F running along the arc of a circle with a radius R. On that vehicle path, a vehicle, for example the motor vehicle K, may move, following the curve of the highway in the clockwise direction. The motor vehicle K is shown only diagrammatically by its wheels, its longitudinal axis and the position of the front and rear axles. The spacing between the two vehicle axles, which is not particularly indicated, namely the axle spacing of the motor vehicle K along the longitudinal axis of the vehicle, is designated l, the axles themselves not being given any specific designation on the drawing. The longitudinal axis of the vehicle K is also the median axis of the radar beam radiated from the pulse radar system (not shown in the drawing) of the vehicle K, the half beam-width being shown in the drawing and designated $\delta$. As is usual in the radar art, the beam-width is defined as the angular distance between the so-called half-power points, which means between the directions in which the beam is radiated at half the power at which it is radiated in the direction of peak beam power.

Parallel, or rather concentric, with the vehicle path F, a guard rail or guide rail L is disposed running in the arc of a circle having the radius $R+\Delta R$. In the direction at which the radar beam is reduced to one-half of the power which is radiated in the peak power direction, namely at the angle δ away from the median, a ray of the radar beam intersects the guide rail L at a point A. The distance between the point A and the front axle of the vehicle K is designated $a_{OT}$. The distance $a_{OT}$ is equal to the shortest distance at which the radar beam, between its half power limits impinges on the guide rail L, so that this or some other object on the corresponding curved line would be detected as a target. The distance $a_{OT}$ is dependent upon the curve radius R and accordingly also upon the steering angle α. If the maximum range OT at which a target is permitted to be detected is controlled in dependence upon the steering angle α, so that all targets at a range OT greater than the spacing $a_{OT}$ are disregarded, false warnings from targets off the road will be avoided.

With reference to the cosine law for triangles, the following equation can be set up for the spacing $a_{OT}$:

$$a_{OT} \approx R(\cos\beta + \sqrt{\cos^2\beta + 2(\Delta R/R) - 1},$$

in which $\beta = 90° + \delta$.

Figure 2:
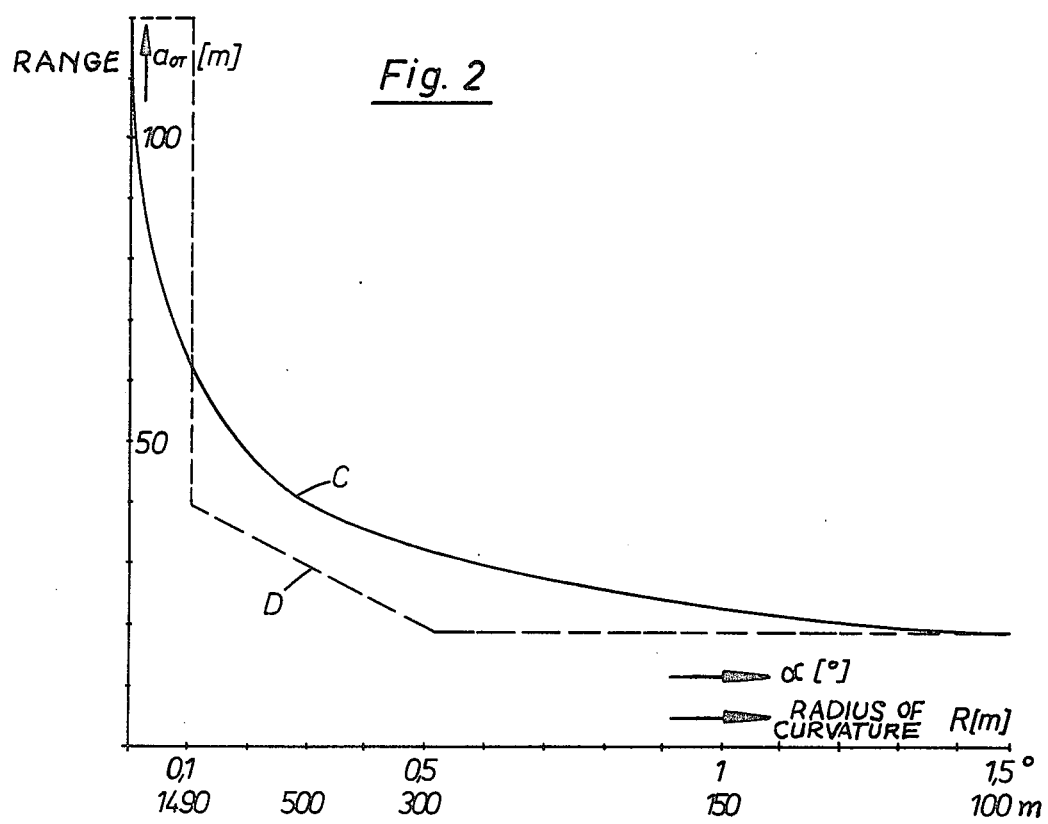
FIG. 2 is a graphical representation of the distance between the vehicle and a curved line dependent upon the steering angle and hence upon the radius of curvature of the vehicle path.

The resulting function for the distance $a_{OT}$ is shown in FIG. 2 as the solid line curve C, in which on the horizontal axis are plotted, on one scale, the steering angle α, and on another scale the radius of curvature of the vehicle path F. An approximation to this curve by rectilinear segments is shown in dashed lines as the curve D. In making that approximation, it has been found desirable to provide for no limitation of the maximum range for steering angles up to about 0.1°, since such small steering angles are also normal in steering a straight path and correspond to normal steering corrections.

It is, moreover, advantageous if the approximation function D in the control region, i.e. for steering angles above 0.1°, should run below the curve C, so that the detection of objects is sure to stop before the curve occupied by the guide rail L in the illustrated example.

Particularly simple solutions of the problem are practically obtained if for steering angles between 0.1° and 0.5° the curve C is approximated by a rectilinear segment of corresponding slope in the curve D, while for larger steering angles a horizontal straight line is used, as shown in FIG. 2.

For implementing the radar range limitation method above outlined, apparatus for control of the maximum detection range are provided that form an electrical signal that is variable in dependence upon the steering angle α in response to which the limit of a range gate may be controlled in a known way, analogous to the control of the range gate in the above-identified copending application. Such an electrical signal can be provided, for example, by means of a potentiometer of which the tap contact is movable by the steering column. Of course, a potentiometer having its tap moved by some other portion of the steering apparatus could similarly be used. Such a signal can be utilized for limitation of the maximum effective range of the radar system at the same time that other signals provided to the control circuits control the defective range of the radar system in dependence on other parameters, such as vehicle speed, maximum braking deceleration of the vehicle and the reaction time of the driver. The latter type of control circuits are, as already mentioned, disclosed in an earlier patent application of the assignee of the present invention.

Figure 3:
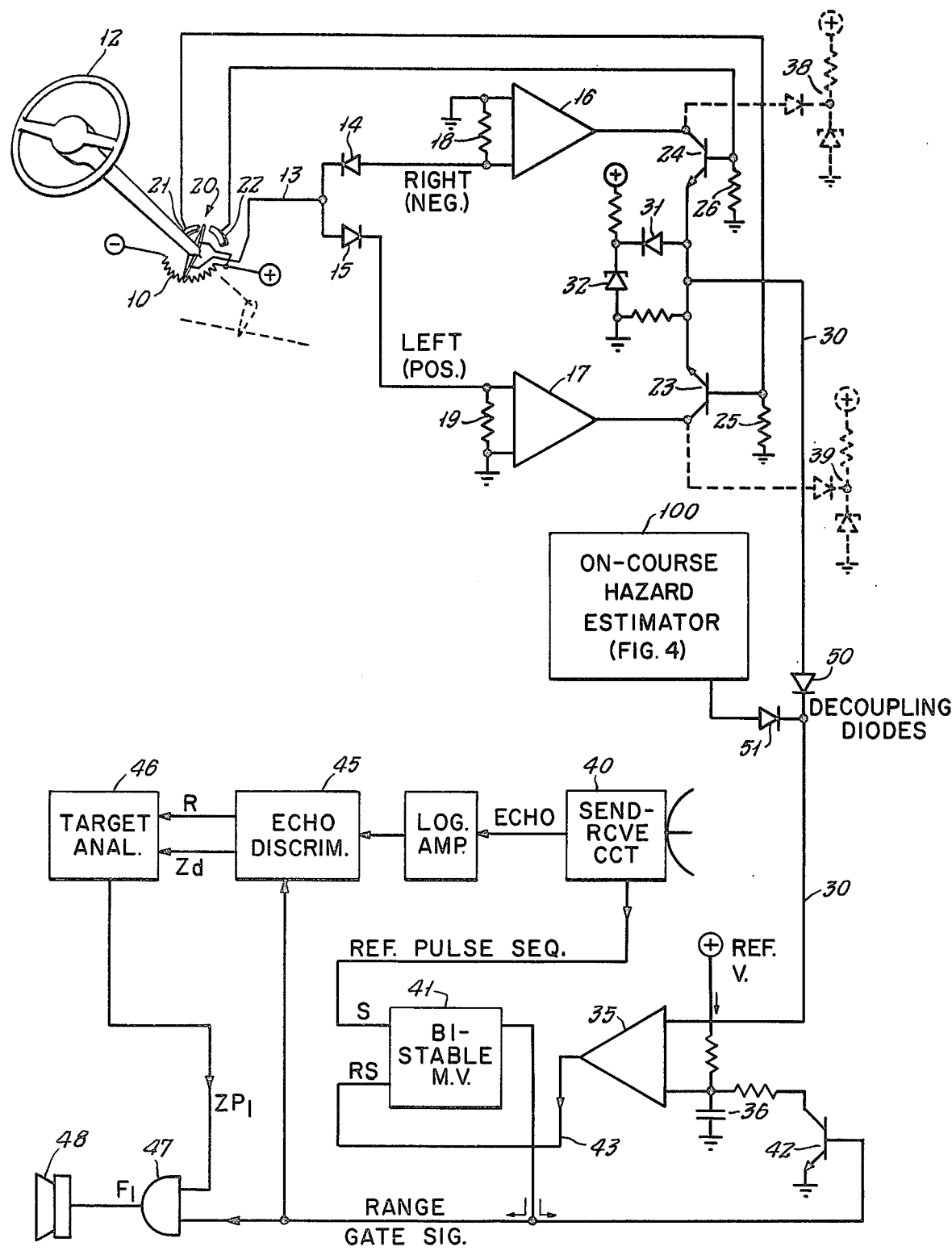
FIG. 3 is a diagram of an apparatus for practicing the invention.

The foregoing is illustrated in FIG. 3 which shows a potentiometer 10 of which the tap connection is controlled by the steering wheel 12. The potentiometer, for simplicity of illustration, is shown connected to a positive voltage at one end and a negative voltage at the other and these voltages are equal, so that when a uniformly wound potentiometer is used, the voltage on the potentiometer tap resulting from a steering angle α to the right will have the same absolute magnitude as the corresponding voltage for the same steering angle to the left, but the polarity of that voltage in steering to the right will be negative and in steering to the left will be positive. The potentiometer tap is connected by the conductor 13 to the diodes 14 and 15 which separate the respective circuits relating to steering to the right and to steering to the left. The other side of the diode 14 is connected to the inverting input of an operational amplifier 16 and the corresponding side of the diode 15 is connected to the non-inverting input of an operational amplifier 17. The remaining inputs of the operational amplifiers 16 and 17 are grounded. Thus, the output of operational amplifier 16 will produce a positive-going signal in response to a steering angle to the right and the output of the operational amplifier 17 will produce a positive-going signal in response to a steering angle to the left. It will be understood, of course, that the potentiometer 10 could be connected between positive voltage and ground, for instance, with the same effect if the non-inverting input of amplifier 16 and the inverting input of amplifier 17 were connected to a voltage midway between the positive voltage applied to the potentiometer 10 and ground as a reference voltage instead of being connected to ground. In that case, the d.c. return paths provided by the high value resistors 18 and 19 respectively for the diodes 14 and 15 would lead to the reference voltage just mentioned instead of to ground.

In order to prevent small steering angles, such as are normally incident to driving along a straight path, from affecting the operation of the radar, a directional switch 20 with a gap between the switch segments 21 and 22 is also controlled by the steering wheel 12, so that neither of the segments 21 or 22 will be energized when the steering is on center or at a very small steering angle on one side or the other, as already described in connection with FIG. 2. In that case, neither of the transistors 23 and 24 will have any base current and the bases will be effectively grounded through their leak resistors 25 and 26. When the wheel 12 is steered to the left far enough to provide positive voltage through the arm of the switch 20 to the segment 21, transistor 23 will receive base current and will be turned on hard, operating as a switch to connect the output of the amplifier 17 to the conductor 30. Similarly, when the wheel 12 is steered to the right far enough to energize the segment 22 of the switch 20, transistor 24 will be turned on hard while transistor 23 remains non-conducting and the output of the amplifier 16 will be connected to the conductor 30. The diode 31 prevents the voltage of the conductor 30 from exceeding a predetermined voltage established by the Zener diode 32, thus establishing a constant voltage for all steering angles above a predetermined angle, as is illustrated in FIG. 2 where that predetermined angle is 0.5°. If it should be desired to set different maxima of signal voltage on the conductor 30 respectively for steering to the left and steering to the right, separate limiter circuits such as the one provided by the diodes 31 and 32 can be connected to the respective collectors of the transistors 23 and 24, utilizing either Zener diodes of different threshold voltages, as shown in broken lines at 38 and 39, or else using a voltage divider instead of or in addition to the Zener diode in at least one case. It should be mentioned in this regard that although no Zener diode is shown in the connection of positive voltage to the potentiometer 10, it is equally desirable that the voltage applied to the potentiometer 10 should be regulated in some suitable fashion, as by a Zener diode or combination of Zener diodes, for instance.

The signal on the conductor 30 is used to produce a range gate signal in the manner more completely described in our above-mentioned copending U.S. patent application. Briefly, the conductor 30 is connected to one input of a comparator 35 the other input of which is provided with time base signals produced by the charging of a capacitor 36. The radar transceiver circuit 40 provides reference pulses for the start of the time base to the set input of a bistable multivibrator 41, causing the transistor 42 to be put at once into its conducting condition, thereby allowing the capacitor 36 which has been charged to a reference supply voltage during the interpulse interval, to discharge. When the capacitor 36 discharges to the voltage that is present at the other input of the comparator 35 that is determined by the signal on the conductor 30, an output is produced by the comparator 35 that is furnished to the reset input of the multivibrator 41 to restore the latter to its starting condition and to terminate the range gate signal on the conductor 43. The transistor 42 is then again non-conducting and the capacitor 36 recharges to reference voltage. The range gate signal is furnished to an echo discriminator of the kind disclosed in our aforesaid copending application which produces a long pulse R and a short pulse $Z_d$, both of which are fed to a target analysis circuit 46 by the echo discriminator 45. The circuit 46 produces a short pulse $ZP_1$ that accurately measures the distance ("range") of the target without allowing the time lapses in the individual circuit blocks of the radar system to spoil the accuracy of the measurement, as explained in our aforesaid copending application.

If the target range measurement pulse $ZP_1$ arrives at the AND gate 47 before the end of the range gate signal furnished by the output 43 of the multivibrator 41, a pulse $F_1$ will be produced and supplied to the loudspeaker 48. This pulse will be repeated at the repetition rate of radar pulses, which is within the audio frequency range, producing a buzz on the loudspeaker 48.

A decoupling diode 50 is inserted in the line 30 because the control of the range gate signal in the circuit of FIG. 3 is effected not only by circuits related to the steering angle in accordance with the present invention, but also by circuits defining the hazard range for targets in the straight ahead direction. These circuits are designated in FIG. 3 by the on-course hazard estimator 100, the output of which is supplied through a decoupling diode 51 to the line 30 that controls the range gate signal through the comparator 35 in the manner just described above.

Figure 4:
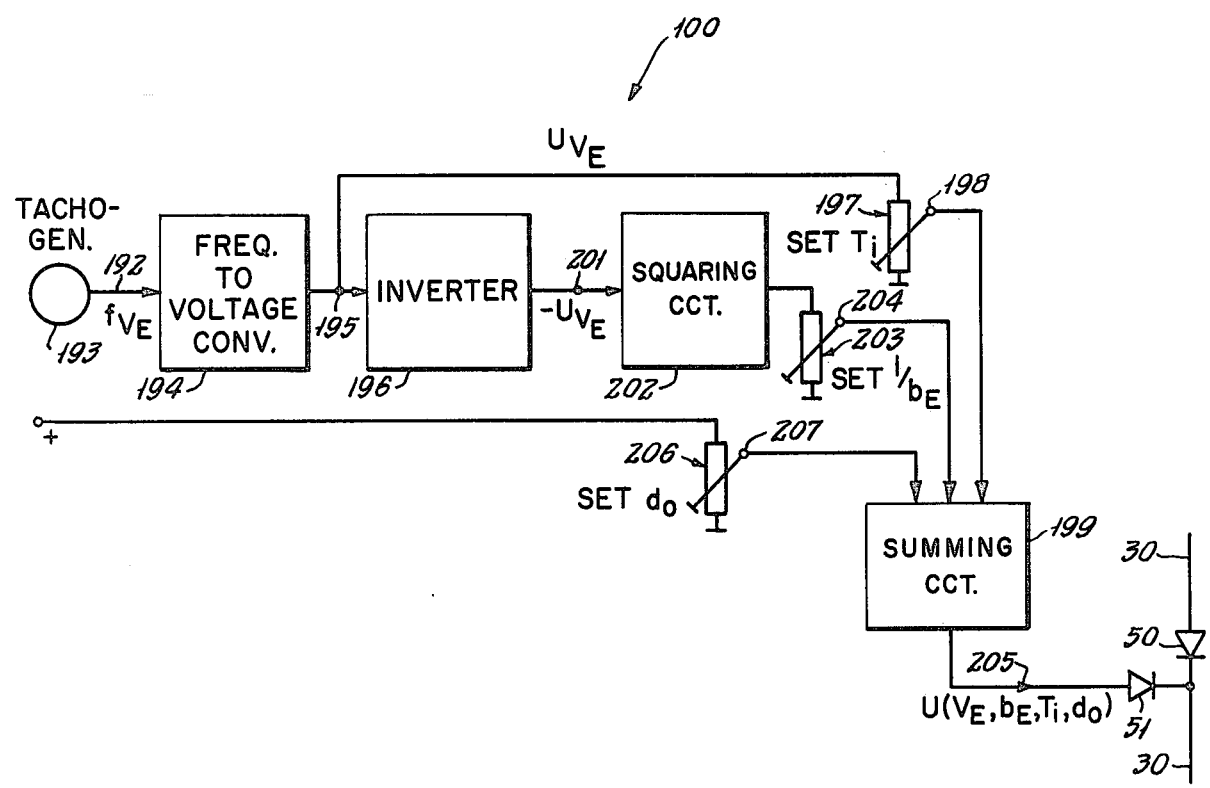
FIG. 4 is a diagram of optional additional circuits shown in FIG. 3 for practicing the invention in a manner which takes account of the rate at which a target is being approached.

The circuits of the on-course hazard estimator 100 are shown in FIG. 4.

FIG. 4 shows that the output of the circuit 100 is produced in response to one variable and to three constants set in by means of potentiometers. The variable is the speed of the vehicle in which the radar system is installed and that is provided by a tacho-generator 193 in the form of a train of pulses of which the frequency is representative to the vehicle speed. This signal, which appears upon the connection 192, is converted into a voltage by the frequency to voltage converter 194, the resulting voltage appearing at the connection point 195 and being supplied both to a potentiometer 197 and to an inverter circuit 196. The voltage at the point 195 represents $U_{v_E}$ and the output of the inverter at the circuit point 201 accordingly corresponds to $-U_{v_E}$, the output of the inverter 196 is supplied to a squaring circuit that develops a voltage proportional to $v_E^2$ and that voltage is supplied to a potentiometer 203. The potentiometer 206 is supplied with a constant voltage.

It has been found desirable for a forward-looking vehicular traffic radar safety system to warn the driver of all objects within a range given by the formula:

$$U(v_E, b_E, T_i, d_o) = (V_E^2/2b_E) + T_i v_E + d_o$$

in which $v_E$ is the speed of the vehicle carrying the radar, $b_E$ is the maximum braking delay time, $T_i$ is the driver's reaction time, and $d_o$ is a minimum margin of safety so that when the target is stationary and directly in the path of the vehicle, the vehicle can be stopped at a certain minimum distance from the target rather than right against the target. In order that the voltage delivered to the line 30 through the diode 51 may be representative of the above-given formula, the potentiometer 197 is set for the factor $T_i$ so that the voltage at its tap 198 will represent the product $T_i v_E$, and likewise the potentiometer 203 is set for the factor $\frac{1}{2} b_E$ so that at the tap 204 there will be the quotient $v_E^2/2b_E$. Finally, the potentiometer 206 is set to provide an additional constant $d_o$. The voltages provided by the taps of the respective potentiometers 197, 203 and 206 are simply added in the summing circuit 199 to provide a voltage representative of $U(v_E, v_E, T_i, d_o)$. Accordingly, when the vehicle is on a straight course and both transistors 23 and 24 are non-conducting, the resetting of the bistable multivibrator 41 by the signal provided by the comparator 35 is controlled by the on-course hazard estimator 100.

It is to be observed that the inclusion of the safety margin potentiometer 206 in the on-course hazard estimator 100 provides enough margin of safety to allow the user of the vehicle to set the potentiometer 197 and 203 himself, which in the long run is simpler and also safer because the user will then be less likely to discount the warning when it is produced. The decoupling diodes 50 and 51 prevent the on-course hazard estimation circuits and the circuits responsive to steering angles from reacting on each other.

It is also possible to use a more elaborate system in which a target closing rate signal is derived from successive values of the target range, so that a warning will not be given for a target at a distance which would make it a hazard if it were standing still in case it should be detected that the target is moving ahead so that the closing rate is low or even zero. Such a system is disclosed in the officially published German patent application (OS) No. 25 44 842. The details of that system, of course, are not necessary for the understanding and practice of the present invention.

Variations are possible, of course, within the inventive concept, as already discussed, for example, in connection with various arrangements shown in broken lines in FIG. 3, and also in connection with the possibility of using a different and more complicated on-course hazard estimator.

We claim:

1. A method of avoiding or reducing response of a vehicle-mounted anti-collision radar system to irrelevant targets when the vehicle in which the radar system is mounted is proceeding in a curved path, comprising the steps of:

producing an electrical signal corresponding to the steering angle defined by the rotary deviation, in either direction, of a steering control of the vehicle from the position of such control for a straight path, which signal has a first predetermined signal value when the steering angle is less than a predetermined angle just large enough to exceed steering correction angles normally necessary in driving on a straight path and has a second predetermined signal value when the steering angle exceeds a second predetermined angle, and, further, has a signal value that varies, between a third predetermined value and said second predetermined value in a manner that is substantially linearly with respect to steering angle between said first and second predetermined angles;

producing repeated range gate signals respectively timed to follow the repeated transmission of pulses by the radar system and having a duration determined in response to said electrical signal, said first predetermined signal value being a value chosen so as to give or allow said range gate signal a maximum duration, and applying the range gate signal to the echo evaluation circuits of said radar system so as to suppress the effect of echoes received after the termination of said range gate signal.

2. A method as defined in claim 1, in which said second predetermined angle and said second and third predetermined signal value are chosen so that in its range of linear variation said signal will have a value that will limit the duration of said range gate to that approximately corresponding to the distance from the radar to the intersection of a radar ray, which is offset from the radar beam axis by a third predetermined angle towards the outside of a steered turn, with a curve concentric to the curved path of a vehicle having a radius of curvature greater than that of said curved path by a predetermined incremental distance ($\Delta R$).

3. Apparatus for avoiding or reducing response to irrelevant targets in a radar system mounted in a motor vehicle having a steering control, the angular position of which defines a steering angle ($\alpha$) relative to the position for straight-ahead movement, when the vehicle is steered in a curved path, comprising in combination:

means for producing an electrical signal of a value dependent upon the steering angle defined by the rotary deviation, in either direction, of a steering control of the vehicle from the position of such control for a straight path;

means for suppressing said electrical signal whenever said steering angle is less than a predetermined limiting angle;

voltage limiting means for maintaining said electrical signal at a constant value during all variations of said steering angle in the range of steering angles greater than a second predetermined steering angle value, said means for producing said electrical signal being such as to provide a signal increasing substantially linearly with respect to steering angle for steering angles between said first and second predetermined steering angle values;

means responsive to said electrical signal for producing after the transmission of each radar pulse by said radar system, a range gate signal terminating at a time controlled by the value of said electrical signal, and means for suppressing the triggering of indications or warnings by said radar system, except within the duration of said range gate signals.

4. Apparatus for avoiding or reducing response to irrelevant targets in a radar system, as defined in claim 3, in which said means for producing said electrical signal includes a potentiometer of which a movable element is controlled by said steering control of said vehicle.

5. Apparatus for avoiding or reducing response to irrelevant targets in a radar system, as defined in claim 3, in which said limiting means are provided in the form of separate limiting means of respectively different signal limiting voltages respectively provided for operation in the two respective directions of steering, on the respective two sides of a straight course.

* * * * *